United States Patent [19]

Taylor et al.

[11] E Patent Number: Re. 32,927

[45] Reissued Date of Patent: May 23, 1989

[54] RESEALABLE CONTAINER CLOSURE

[75] Inventors: Robert L. Taylor, Chester; Danny R. Sink; Daniel F. Cudzik, both of Richmond, all of Va.

[73] Assignee: Reynolds Metals Company, Richmond, Va.

[21] Appl. No.: 105,122

[22] Filed: Oct. 6, 1987

Related U.S. Patent Documents

Reissue of:

[64] Patent No.: 4,574,975
Issued: Mar. 11, 1986
Appl. No.: 657,624
Filed: Oct. 4, 1984

U.S. Applications:

[63] Continuation-in-part of Ser. No. 653,469, Sep. 20, 1984, abandoned, which is a continuation of Ser. No. 547,424, Oct. 31, 1983, abandoned.

[51] Int. Cl.[4] ..... B65D 41/16; B65D 41/18

[52] U.S. Cl. ..... 220/306; 220/309; 220/380

[58] Field of Search ..... 220/306, 307, 380, 254; 215/272, 320, 321

[56] References Cited

U.S. PATENT DOCUMENTS

| | | | |
|---|---|---|---|
| Re. 25,906 | 11/1965 | Livingstone . | |
| 1,201,082 | 10/1916 | Nussbaumer . | |
| 1,546,159 | 7/1925 | Wippler . | |
| 1,613,826 | 1/1927 | Hind . | |
| 1,902,892 | 3/1933 | Pottenger . | |
| 1,946,981 | 2/1934 | Lower . | |
| 2,004,852 | 6/1935 | Coyle . | |
| 2,036,858 | 4/1936 | Sacks . | |
| 2,084,084 | 6/1937 | Greer . | |
| 2,168,734 | 8/1939 | Freeman . | |
| 2,208,899 | 7/1940 | Freeman . | |
| 2,214,422 | 9/1940 | Kronquest | 220/62 |
| 2,215,392 | 11/1940 | Freeman . | |
| 2,303,733 | 12/1942 | Freeman . | |
| 2,393,578 | 1/1946 | Waite . | |
| 2,486,364 | 10/1949 | Simmons . | |
| 2,614,727 | 10/1952 | Robinson . | |
| 2,620,938 | 12/1952 | Jesnig . | |
| 2,639,058 | 5/1953 | Lobl . | |
| 2,704,100 | 3/1955 | Freeman . | |
| 2,711,840 | 6/1955 | Gits et al. . | |
| 2,776,691 | 1/1957 | Tupper . | |
| 2,819,748 | 1/1958 | Catalano . | |
| 2,869,746 | 1/1959 | Wilcox . | |
| 2,922,563 | 1/1960 | Aldington . | |
| 3,074,578 | 1/1963 | Hester . | |
| 3,352,448 | 11/1967 | Livingstone . | |
| 3,486,665 | 12/1969 | La Croce . | |
| 3,527,375 | 9/1970 | Klein . | |
| 3,589,551 | 6/1971 | Haggbom . | |
| 3,606,074 | 9/1971 | Hayes . | |
| 3,628,542 | 12/1971 | Drew . | |
| 3,642,167 | 2/1972 | Kinney . | |
| 3,688,942 | 9/1972 | Mitchell et al. . | |
| 3,727,787 | 4/1973 | Gregory . | |
| 3,907,158 | 9/1975 | Frankenberg . | |
| 3,994,410 | 11/1976 | Pirgov et al. . | |
| 4,061,244 | 12/1977 | Tucker . | |
| 4,094,460 | 6/1978 | Scanga et al. . | |
| 4,106,662 | 8/1978 | Strobe et al. . | |
| 4,113,134 | 9/1978 | Heintzelman . | |
| 4,262,815 | 4/1981 | Klein . | |
| 4,291,813 | 9/1981 | Allen et al. . | |
| 4,301,941 | 11/1981 | Kraft . | |
| 4,341,324 | 7/1982 | Ramirez . | |
| 4,356,929 | 11/1982 | Müller-Kühn et al. . | |
| 4,376,493 | 3/1983 | Gall . | |
| 4,387,820 | 6/1983 | Ignell . | |
| 4,399,924 | 8/1983 | Nilsson . | |
| 4,465,205 | 8/1984 | Sutch . | |
| 4,487,326 | 12/1984 | Uhlig . | |
| 4,709,832 | 12/1987 | Mantyla | 220/306 |

FOREIGN PATENT DOCUMENTS

| | | |
|---|---|---|
| 826555 | 11/1951 | Fed. Rep. of Germany . |

(List continued on next page.)

*Primary Examiner*—George T. Hall
*Attorney, Agent, or Firm*—Alan T. McDonald

[57] ABSTRACT

A resealable closure device for use on metallic cans is disclosed. The closure device comprises a metallic end including a flanged opening therein and a molded rubber or plastic element which is molded in an "inverted umbrella" position and which is capable of being inverted upon itself to seal onto the end.

51 Claims, 6 Drawing Sheets

FOREIGN PATENT DOCUMENTS

| | | |
|---|---|---|
| 1924472 | 11/1969 | Fed. Rep. of Germany . |
| 2718692 | 11/1977 | Fed. Rep. of Germany . |
| 7801717 | 5/1978 | Fed. Rep. of Germany . |
| 2814594 | 10/1979 | Fed. Rep. of Germany . |
| 144746 | 11/1980 | Fed. Rep. of Germany . |
| 3216868 | 1/1983 | Fed. Rep. of Germany . |
| 3207198 | 9/1983 | Fed. Rep. of Germany . |
| 3208994 | 9/1983 | Fed. Rep. of Germany . |
| 8228681 | 10/1983 | Fed. Rep. of Germany . |
| 368095 | 11/1906 | France . |
| 677495 | 3/1930 | France . |
| 828633 | 5/1937 | France . |
| 828967 | 6/1938 | France . |
| 836941 | 1/1939 | France . |
| 1023521 | 3/1953 | France . |
| 1149455 | 12/1957 | France . |
| 1216506 | 4/1960 | France . |
| 1370442 | 10/1963 | France . |
| 1505614 | 11/1967 | France . |
| 1558212 | 3/1968 | France . |
| 2377333 | 8/1978 | France . |
| 2427956 | 1/1980 | France . |
| 2464196 | 3/1981 | France . |
| 2499029 | 8/1982 | France . |
| 07-3986 | 4/1932 | Japan . |
| 49-93188 | 10/1974 | Japan . |
| 74121 | 9/1953 | Netherlands . |
| 140430 | 7/1968 | Spain . |
| 157079 | 3/1970 | Spain . |
| 162252 | 10/1970 | Spain . |
| 166399 | 2/1971 | Spain . |
| 272737 | 6/1983 | Spain . |
| 273126 | 6/1983 | Spain . |
| 277630 | 2/1984 | Spain . |
| 283963 | 1/1985 | Spain . |
| 283964 | 1/1985 | Spain . |
| 109104 | 6/1925 | Switzerland . |
| 193582 | 10/1937 | Switzerland . |
| 465368 | 5/1937 | United Kingdom . |
| 693027 | 6/1953 | United Kingdom . |
| 1054335 | 1/1967 | United Kingdom . |
| 1054334 | 1/1967 | United Kingdom . |
| 1282754 | 7/1972 | United Kingdom . |
| 1389747 | 4/1975 | United Kingdom . |
| 1407601 | 9/1975 | United Kingdom . |
| 1438136 | 6/1976 | United Kingdom . |
| 2021532 | 12/1979 | United Kingdom . |
| 2091706 | 8/1982 | United Kingdom . |
| 2122587 | 1/1984 | United Kindgom . |

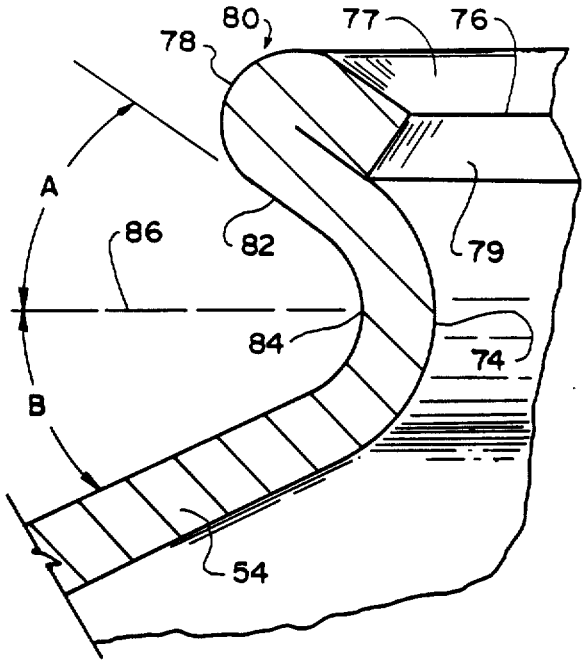
FIG. 11
FIG. 12
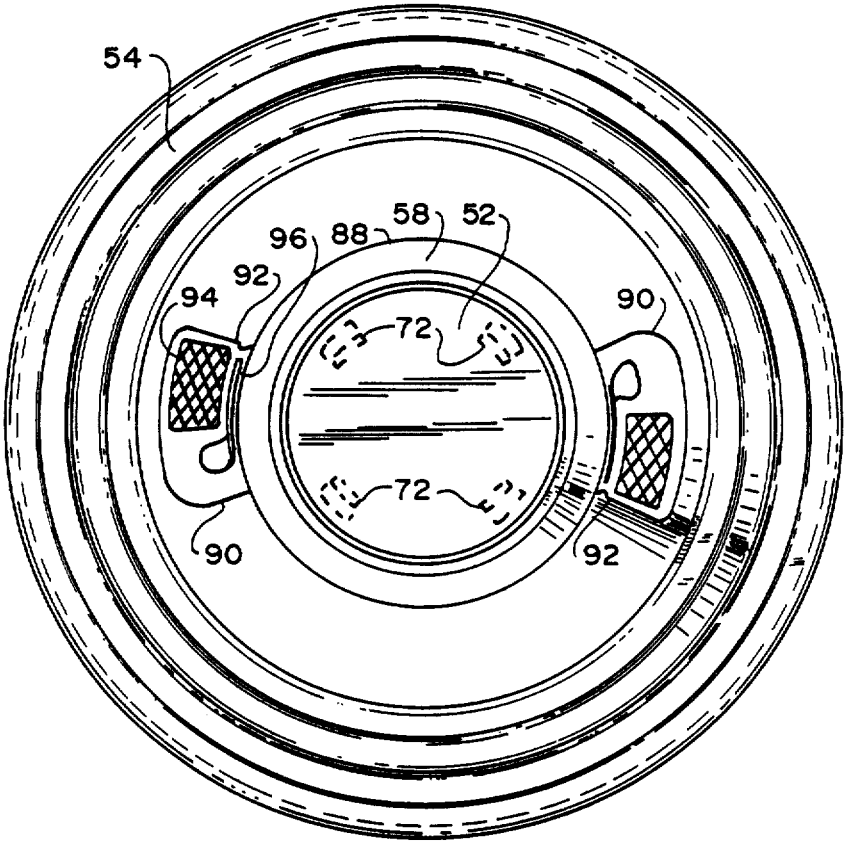

RESEALABLE CONTAINER CLOSURE

Matter enclosed in heavy brackets [ ] appears in the original patent but forms no part of this reissue specification; matter printed in italics indicates the additions made by reissue.

RELATED APPLICATIONS

This is a continuation-in-part of Ser. No. 653,469 filed Sept. 20, 1984 now abandoned, which is a continuation of Ser. No. 547,424, filed Oct. 31, 1983, now abandoned.

BACKGROUND OF THE INVENTION

Numerous closures for container bodies, such as metallic cans, glass or plastic bottles or jars and the like are known. For bottles or jars, resealable closures, in the form of metallic screw-on caps or tops, are commonplace. For metallic cans that contain beverages, such as beer and soft drinks, however, no commercially successful resealable closure is known. The commercially employed closure elements for can bodies include the ring-pull or "pop top" can end and the nondetachable or "stay-on-tab" can end.

In the case of metallic cans, the inability to provide a practical resealable closure device has limited, at least in the case of beverage cans, the size of the container. Thus, while plastic and glass bottles having a capacity as high as two liters have become commercially successful, metallic beverage cans have been limited, for the most part, to single serving sizes, having a maximum capacity of about 16 ounces (0.473 liters). It is thus a primary objective of the present invention to provide a resealable closure device for metallic can bodies which will enable metallic cans to serve the large capacity beverage container market.

It is also a primary objective of the present invention to provide a resealable closure device which may be employed on metallic cans whether the contents of the container are packaged under a vacuum, are at atmospheric pressure or are internally pressurized.

It is another primary object of the present invention to produce a resealable closure device which can be seamed to a can body according to the methods and using the equipment commonly found in the can filling lines. Thus, it is an objective of the present invention to provide a resealable closure which, in part, comprises a metallic end.

It is an additional objective of the present invention to employ an "over-center" sealing mechanism. In such a sealing mechanism, a flexible closure element is molded in an upstanding or "inverted umbrella" position. When in place, the closure element is inverted on itself, causing the element to tighten itself in place.

The use of the over-center sealing mechanism has been described in the literature. However, none of the known over-center closure devices have been successfully commercially applied to a metallic can used for such purposes as for containing beverages and the like.

U.K. patent application No. GB2091706A illustrates, in one embodiment, an over-center closure device for a container having an external bead about its mouth. The closure device is in the form of a flexible element having a skirt portion which can be moved with respect to the plane surface of the closure device from an upwardly extending position to a downwardly extending position where a bead formed on an internal surface of a connecting portion between the plane surface and the connecting device and the skirt or lever portion engages a sloping surface of the container mouth bead. In the lowered position, the skirt or releasing flange extends at an angle away from the container wall and makes no contact therewith. Also, with the skirt extending upwardly, the closure element cannot be snugly seated on the container wall.

An immediate problem with the closure device of this reference is apparent from the fact that the skirt extends outwardly from the container wall thus leaving the sealing connection between the closure device's bead and the bead of the container mouth exposed to dirt and other debris which may be encountered in using the container. The exposed location of the skirt also allows for accidental premature opening of the container during shipping and storage and does not permit close packing of the containers. In addition, in the event the contents of the container are pressurized, it appears that the portion of the closure device's bead in contact with the mouth bead would be insufficient to prevent blow off of the closure device particularly where elevated pressures are encountered in the container. One reason for this is that the slope of the surface of the mouth bead is insufficient. Another reason is that the upward bulging of the top of the closure tends to rotate the skirt further downwardly about the mouth bead, and since the skirt is not restrained from such movement, a leveraged pressure is placed on the relatively small area of the closure device bead in contact with the mouth bead, creating a tendency for the closure device bead to deform. Further, it would be difficult to control venting of the contents of the container with such a closure device in the event the contents were pressurized.

French published patent application No. 2,377,333 illustrates an over-center device for glass bottles. In this device, an over-center tightening element is attached to an end wall portion of the closure. When in its closed position, the tightening element pulls the end wall against the mouth of the bottle, with sealing occurring only at the top surface of the bottle.

Problems with this closure come from the location of the seal. Internal pressure acting against the end wall of the closure may lift the end wall from the mouth of the bottle, possibly causing leakage of pressure and/or the product from the container. Additionally, with sealing on the end of the bottle mouth alone, no provision is made for controlled venting of internal pressure when opening the bottle using this closure device. Thus, when returned to its loosened position, internal pressure within the bottle will tend to blow the closure off of the bottle uncontrollably, a result which is unacceptably dangerous for the consumer.

Another known over-center closure device is described in U.S. Pat. No. 4,376,493. In this patent, a large diameter can, such as a paint can, includes a cover which locks onto the can. There are also problems involved with this closure which make it unacceptable for pressurized cans.

This patent requires that the can body have a downwardly directed flange and that the closure device hook under the lip of the flange. This has been found to be unacceptable for several reasons. The resilient materials, such as plastics resins, forming such closure devices tend, over time, to permanently deform or "creep" somewhat. This deformation makes it difficult to remove the closure of this patent from the can and may cause damage to the flange of the can or the sealing surface of the closure during removal. This deformation, with or without the additional problem of flange damage, also makes resealing of the container difficult.

Another problem with the structure of this patent lies in the region of sealing between the closure and the can. In this patent, it is preferred that sealing also occur between a well or wall of the closure and the inner side wall of the container. The seal continues around the flange and may continue under it, unless spaced locking members are employed. Such a seal will not controllably vent internal pressure within the can when opened, again creating the possibility of allowing the internal pressure to blow the closure element off of the container when the closure is returned to the unlocked position.

An additional problem caused by the presence of a central plug member, especially in pressurized cans, is the tendency of the internal pressure to push against the plug, causing the plug to displace upwardly, resulting in additional stresses on the locking mechanism and possibly destroying the central seal.

Another known over-center closure device is shown in U.S. Pat. No. 4,387,820. This patent, similar to U.S. Pat. No. 4,376,493, relies upon contact between an inner wall of the container and the closure element for sealing, with the seal continuing against the mouth at the top of the container. A plurality of spaced locking means hook under the container bulge or groove to close the container. Such a closure cannot seal on the outer periphery of the container, due to the presence of the spaced locking levers. Further, the inner surface seal eliminates any change of controlled venting, again allowing occurrence of the blow off problem previously described.

It is thus a primary objective of the present invention to provide an over-center closure device which overcomes the shortcomings of the known devices of this type.

THE PRESENT INVENTION

By means of the present invention, these desired objectives have now been obtained.

The closure device of the present invention comprises two components: a metallic end and a flexible closure element. The metallic end may be sealed to a can body using conventional sealing techniques, such as double seaming, or by such means as adhesive bonding. The end has an opening therein which is surrounded by an outwardly directed and upstanding beaded, hemmed or curled flange. The flexible closure element forms the resealable closing device. This closure element includes a central panel which closes the opening in the metallic end and a lever and nose which are activated to seal the closure element onto the end. The nose does not hook under the edge of the hemmed flange, but is tightly held thereagainst by tension within the closure element, as well as by the internal pressure within the can body, when so filled. Hooking in the context of this invention means, for example, locating a portion of the closure element underneath the lip of the flange. Such hooking has been found to involve the risk of damaging the closure element and/or distorting the lip of the flange, when the closure element is removed from the flange lip. A sealing region which extends from a line around the outer flange surface to a tangent line between the central panel of the closure device and the flange provides a leakproof seal when closed and permits controlled venting of internal pressure within the can when released, without blowing the closure element off the end.

It will thus be seen that the present invention includes a closure device for a can comprising a metallic end wall and a flexible closure element, the metallic end wall having a opening bounded by an outwardly and upwardly flaring beaded flange and which has means adjacent its periphery for attachment to a can, the metallic end wall including an upwardly and inwardly tapering section between said flange and said attachment means; the flexible closure element including a central panel, a lever portion and a connecting portion connecting the central panel and the lever portion, the lever portion being initially formed as a generally upwardly-directed frustoconical skirt portion and, when viewed in vertical cross-section, having a nose at its connection with said connecting portion, the metallic end and closure element being constructed and arranged such that upon positioning said closure element over the opening in the metallic end wall and inverting said lever portion to a generally downwardly directed position, the nose portion will sealingly contact the outer surface of the flange without mechanically hooking under the flange and the connecting portion will sealingly contact the flange while the lever portion abuts against the tapering section of the metallic end wall.

BRIEF DESCRIPTION OF THE DRAWINGS

The closure device of the present invention will be more fully described with reference to the FIGURES in which:

FIG. 11 is an enlarged detailed view of the flange of the embodiment of FIG. 10; and FIG. 12 is a top plan view of the embodiment of FIG. 10.

DETAILED DESCRIPTION OF THE PREFERRED EMBODIMENTS

Figure 1:
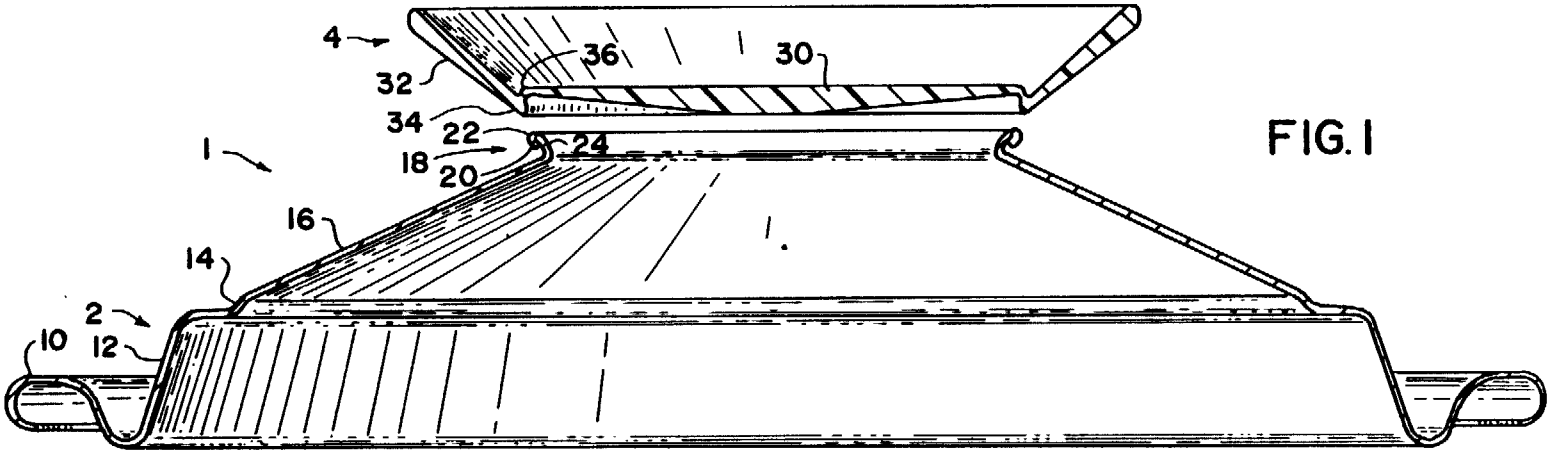
FIG. 1 is a cross-sectional view of the closure device of the present invention just prior to mating of the metallic end and the flexible closure element.

Turning now to the FIGURES, and particularly to FIGS. 1 through 4, the closure device 1 of the present invention is illustrated. The closure device 1 is in two parts: a metallic end 2 and a flexible closure element 4. The metallic end 2 preferably includes a curl 10, to enable the closure device 1 to be double seamed to a can body, as is practically standard in the industry. If desired, however, curl 10 could be eliminated, in such situations as where it is desired to adhesively bond the closure device 1 to the can body. A first inner panel wall 12 and second inner panel wall 16 give height and column strength to the end 2. The elevated conical height provided by panels 12 and 16 helps improve pouring characteristics of containers having the closure device 1 thereon. A stacking bead 14 provides for stable vertical stacking of filled cans with closure 1 thereon.

The metallic end 2 is open at its center, with a flange region 18 being formed at its central opening. The flange region 18 is upwardly and outwardly-directed with relation to the opening in the end 2 and includes an outer flange surface 20, a top flange surface 22 and an inner flange surface 24. As illustrated in FIGS. 1 through 4, the flange 18 is formed by beading or hemming metal of end 2 outwardly. As will be described below, this is not an absolute requirement; alternatively, the flange 18 may be formed by inward beading.

In one embodiment, the closure element 4 includes a central closing wall or panel 30 and a generally frustoconical lever member or skirt 32. Central panel 30 may be formed having a tapering reduced thickness from its center to its outer edges, adding strength to the closure element 4. However, this panel 30 is preferably formed having predominantly a single thickness as described in another embodiment. The lever member 32 may be of increased thickness from its connection to the central wall 30 to its outer edge. However, it may take other forms, such as by having a generally circular thickened ring at the outer edge thereof, or by having a constant thickness along its length, as will be described in another embodiment. Lever member 32 is connected to central wall 30 by means of a transitional region 36 and a nose portion 34 is formed at the inner end of the lever 32. It is preferred that the nose 34 be at a diameter approximately equal to or slightly larger than the outer diameter of the flange 18. It is possible, however, to permit the diameter of the nose 34 to be slightly less than that of the flange 18, providing an interference fit in this case, for high-speed application of the closure element 4 to the end 2.

It has been found that improved sealing of the closure element 4 to the metallic end 2 may occur if the closure element 4 and/or the metallic end 2 is heated, such as to a temperature of between about 95° and 120° F. as these components are assembled.

Permissible materials for the metallic end 2 include those materials typically used in can making, such as steel and aluminum alloys, with preference being made to aluminum. The flexible closure element 4 may be formed of rubber or a plastic resin, such as polypropylene, polyethylene, and the like. Polypropylene is preferred.

To improve compatibility between the sealing surfaces of metallic end 2 and closure element 4, a surface coating material may be placed on the sealing surfaces of metallic end 2 and/or closure element 4. Typical of such materials are waxes, lacquers and the like. If necessary to reduce the gas transmission rate of the closure element 4, this element 4 may be coated with a low gas transmission rate material, such as [polyvinyldene] *polyvinylidine* chloride (PVDC) or ethylene vinyl alcohol (EVOH).

Figure 2:
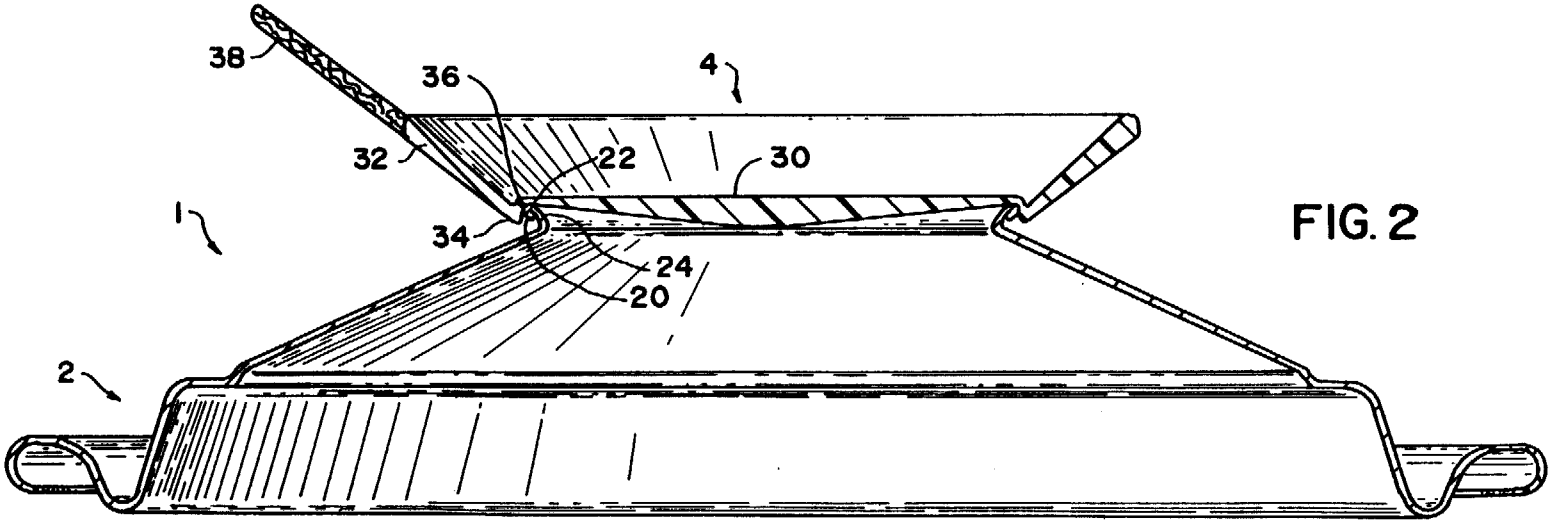
FIG. 2 is a cross-sectional view of the closure device of the present invention after placing the flexible closure element onto the metallic end.

In FIG. 2, the closure element 4 has been positioned onto the metallic end 2, but closing of the closure element 4 has not yet begun. As can be seen in this FIGURE, the transitional zone 36 of the closure element 4 is in contact with the top surface 22 and a rounded portion of the outer portion 20 of flange 18. Central panel 30 may also be in contact with the top wall 22 of the flange 18. However, the inner surface 24 of flange 18 is not in contact with the central panel 30, for reasons that will be more fully explained below. Thus, central panel 30 does not provide a plug for the central opening of the metallic end 2, but rather provides a cover therefor.

This FIGURE also illustrates the addition of a tab 38 connected at the outer end of lever 32. This tab 38, while optional, is preferred, in that tab 38 permits easier opening of the closure device 1 by providing an extension along a portion of lever 32 for a consumer to lift.

Figure 3:
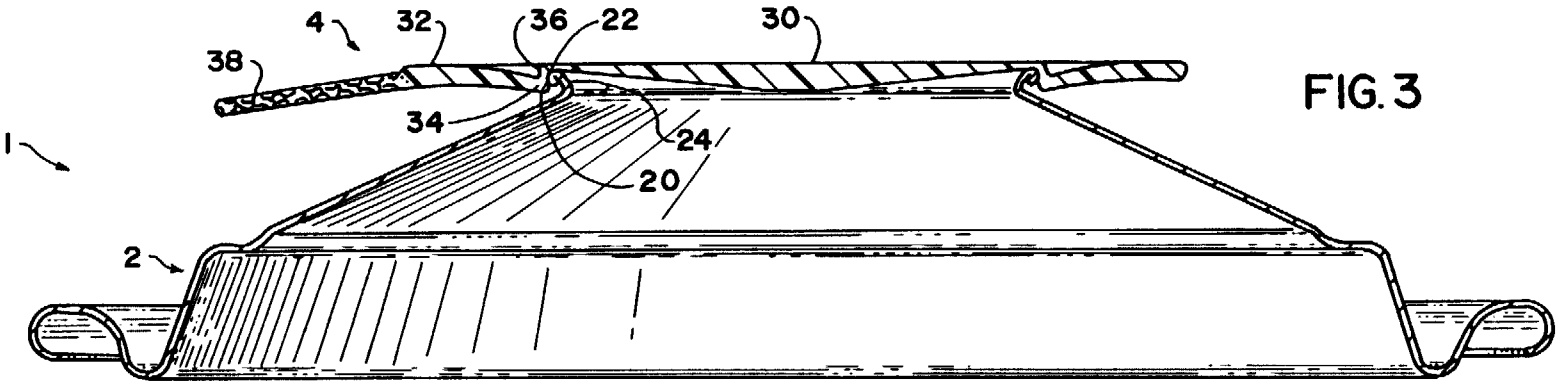
FIG. 3 is a cross-sectional view of the closure device of the present invention partially through the closing process.

In FIG. 3, the closure element 4 is in the process of being sealed onto flange 18 of metallic end 2. Nose 34 is approaching outer surface 20 of flange 18 while the transitional zone 36 remains in contact with flange 18 in the region previously mentioned. Central panel 30 remains out of contact with the inner surface 24 of flange 18.

Lever 32 has become bowed. This bowing comes from internal tension within the closure element 4. As previously shown, closure element 4 is molded in an upright or "reverse umbrella" position. As lever 32 is moved downwardly, such that closure element 4 becomes sealed onto metallic end 2, internal forces caused by the movement of lever 32 from its initially molded upright position through the horizontal and overcenter and downwardly past the horizontal creates tension within lever 32, which tension acts to pull lever 32 and nose 34 closer to central panel 30, aiding in the sealing operation.

Figure 4:
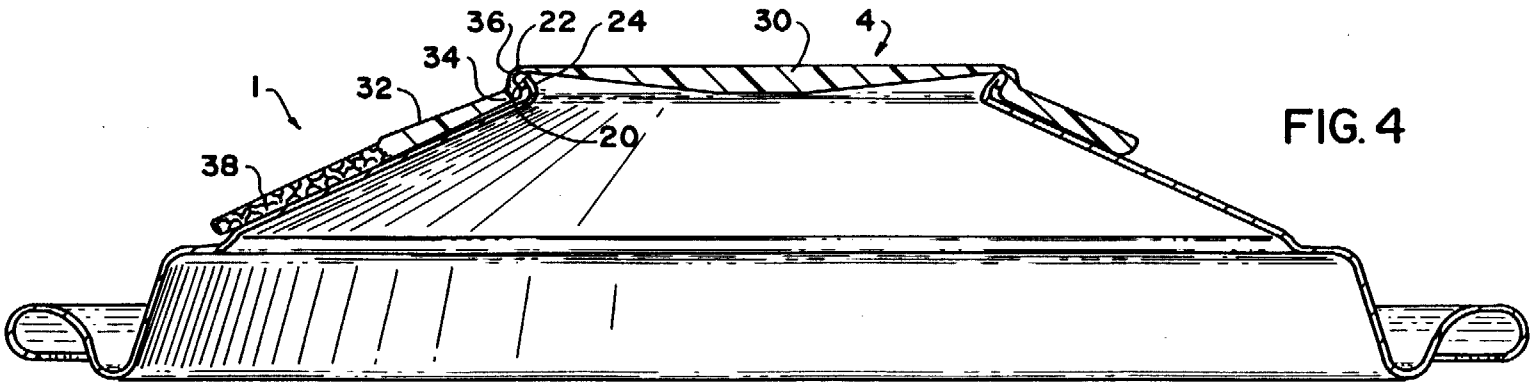
FIG. 4 is a cross-sectional view of the closure device of the present invention in the fully closed position.

In FIG. 4, closure device 4 has been fully sealed onto metallic end 2. Nose 34 is in sealing engagement with the outer surface 20 of flange 18. It should be noted that in this embodiment nose 34 does not extend completely under the edge 21 of the flange 18. When closure element 4 is on metallic end 2 for an extended period of time, natural plastic deformation will occur. Thus, in this embodiment, closure element 4 will tend to mold itself to the shape it is in. If nose 36 were positioned under edge 21, FIG. 7, plastic flow into this region would occur, making it extremely difficult to remove the closure element 4 from the metallic end 2, with the added possibility of damage to the flange 18. Such plastic deformation, along with the potential damage to flange 18 upon removal of the closure element 4 from the metallic end 2, makes resealing of the closure element 4 onto the metallic end 2 difficult and unreliable.

In addition to the sealing of nose 34 to outer surface 20, transitional region 36 is in sealing engagement with the remainder of the outer surface 20 and a region up to the tangent line of central panel 30 with the top surface 22 of the flange 18. Again, central panel 30 is not in sealing engagement with the inner surface 24 of flange 18.

In the completely sealed position, there remains tension within lever 32. Lever 32, after passing the horizontal or over-center position, does not return to an untensioned position, as in its as-molded "reverse umbrella" position. This residual tension in lever 32 help maintain the tight seal between the nose 34 and the outer surface 20 of flange 18. This residual tension results, at least in part, from the inability of skirt 32 to rotate downwardly further, due to the firm contact against wall 16 of the outermost portion of skirt 32. It is theorized that, if lever 32 were unsupported, the closure element 4 would tend to creep off of end 2 when the closure device 1 is placed on a pressurized can.

Figure 5:
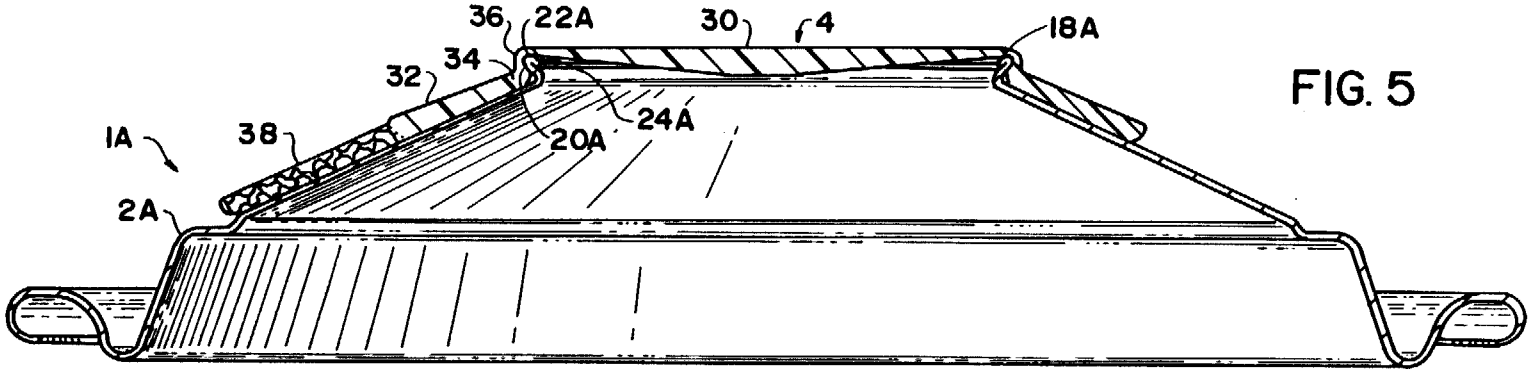
FIG. 5 is a cross-sectional view of the closure device of the present invention in the fully closed position, including a modified metallic end.

FIG. 5 illustrates the closed position of closure element 4 on a modified can end 2A. The modified end 2A has its flange region 18A beaded or hemmed inwardly, forming an outer surface 20A, a top surface 22A, and an inner surface 24A. In this modified closure device 1A, it is readily apparent that the nose 34 cannot hook under outer surface 20A, since there is no abrupt end to outer surface 20A, as this surface 20A is transitioned into wall 16.

Also, it should be again noted that transitional region 36 contacts the balance of outer surface 20A and a portion of the top surface 22A until the lower surface of central panel 30 becomes tangent with top surface 22A. There is, as in the previous embodiment, no sealing engagement between the central panel 30 and the inner surface 24A of flange 18A.

Figure 6:
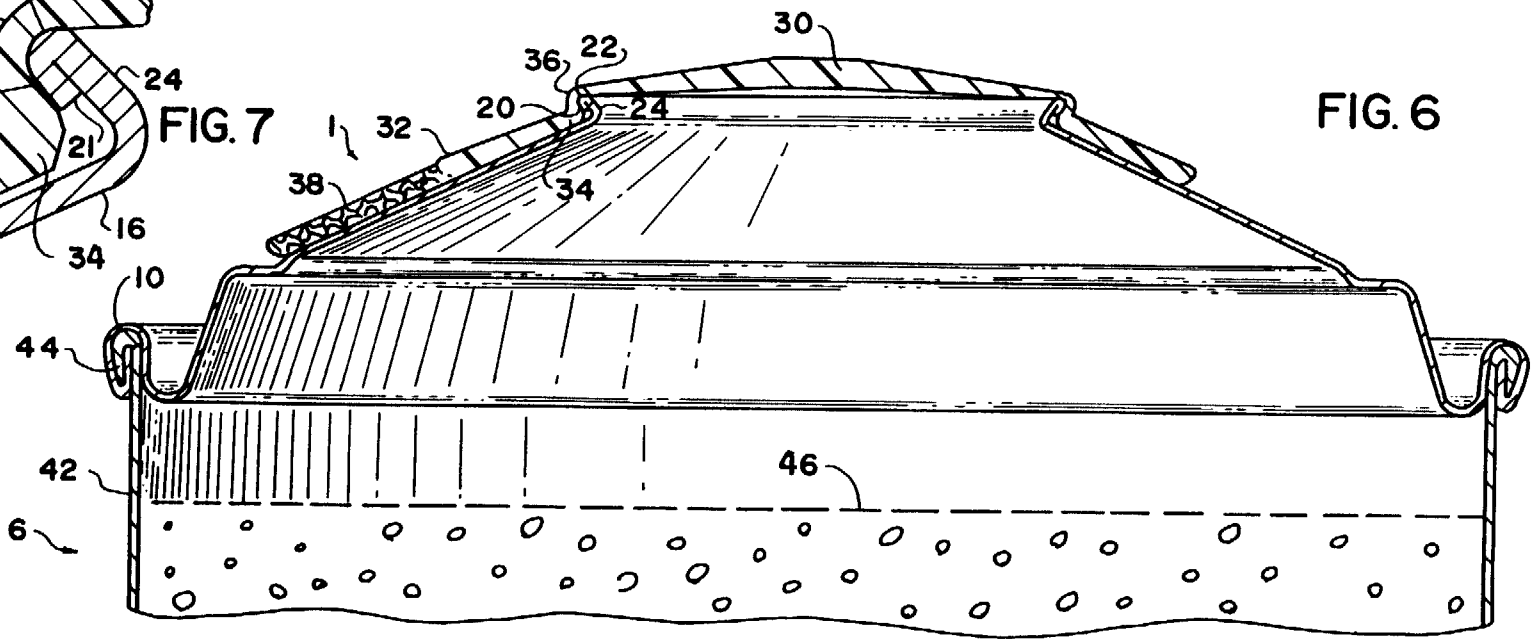
FIG. 6 is a cross-sectional view illustrating the closure device of the present invention on an internally pressurized can body.

FIG. 6 illustrates the sealing of closure device 1 onto a container body 6 having been filled with an internal pressure-generating material 46, such as a soft drink or beer. The sidewall 42 of can 6 includes a flange 44 which has now been double seamed to curl 10 in a conventional manner. The internal pressure within container 6 has caused central panel 30 to bulge outwardly slightly, with the tension caused by this internal pressure on central panel 30 causing added inwardly directed circumferential sealing between the nose 34 and the outer surface 20 of flange 18 and the transitional region 36 with its associated sealing regions 20 and 22. Thus, increased internal pressure within can 6 increases the seal of closure 1, rather than tending to cause seal failures, as in the prior-known closing structures.

Figure 7:
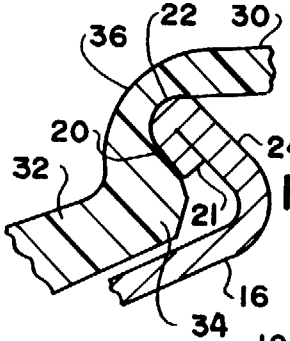
FIG. 7 is an expanded cross-sectional view of the flange region of FIG. 6, illustrating the sealing region of the closure device of the present invention.

FIG. 7 is an exploded view of the flange region of FIG. 6, more closely illustrating the sealing region between metallic end 2 and closure element 4 when positioned on a pressurized can 6. As can be seen in this FIGURE, nose 34 contacts a portion of outer surface 20 of the flange 18, but no portion of nose 34 is positioned under the end 21 of surface 20. Thus, there is no mechanical hook between metallic end 2 and closure element 4. The transitional zone 36 contacts the balance of outer surface 20 to a line on the top surface 22 of flange 18 where the central panel 30 becomes tangent to flange 18. Thus, no seal occurs between central panel 30 and inner surface 24 of flange 18.

The reason for this sealing arrangement becomes evident with a understanding of the opening of closure device 1 on internally pressurized can 6. Upon lifting of tab 38 or a portion of lever 32, nose 34 and transitional zone 36 separate from flange 18 in the area of tab 38 or area of lifting of lever 32. This separation occurs only for about one quarter of the circumference of flange 18. Further, it permits controlled venting or escape of the internal pressure within can 6. The remainder of lever 32 may then be moved back to its as-molded "inverted umbrella" position and the closure element 4 lifted from the metallic end 2.

If central panel 30 were permitted to be in sealing engagement with inner surface 24 of flange 18, such that central panel 30 formed a plug for the opening defined by flange 18, controlled venting would not occur by the lifting of tab 38 or a portion of lever 32. This would require that the entire lever 32 be returned to its upright position while internal pressure remained within the can 6, allowing the internal pressure within can 6 to blow off the closure element 4, which is not acceptable. It is thus important to confine the sealing area to the outer surface 20 of flange 18 and the top surface 22 of the flange 18 and avoid sealing along the [plane] inside surface 24 of flange 18.

Figure 8:
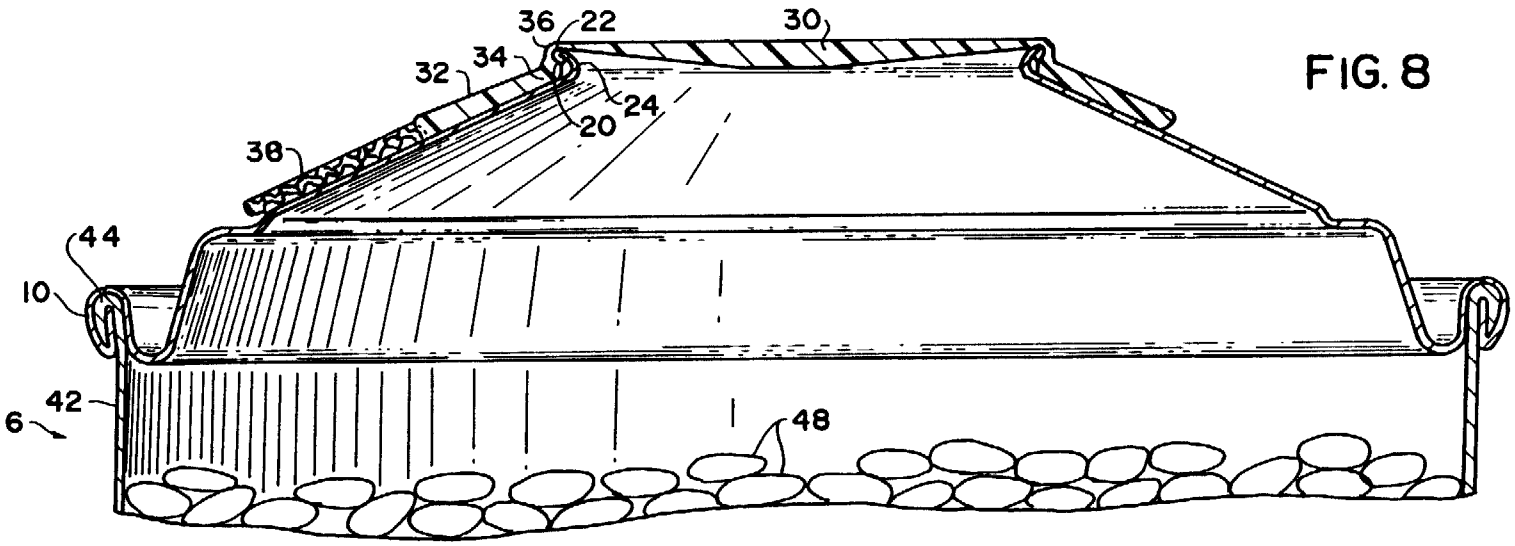
FIG. 8 is a cross-sectional view of the closure device of the present invention mounted on an unpressurized can.

FIG. 8 illustrates the use of the closure device 1 of the present invention to seal a can 6 which contains product which is not under internal pressure, such as water, peanuts 48 as shown, wine and the like.

While there may be no internal pressure within can 6, and thus the central panel 30 of closure element 4 is not outwardly deflected, such that no additional locking is added to the closure element 4, as previously mentioned, the tension within lever 32 provided by the inverting of the closure element 4 upon itself still provides a sufficient seal for the closure device 1. In that regard, it should be noted that the relative positioning of the various portions of closure element 4 in relation to metallic end 2 in this embodiment are identical to that shown in FIG. 4, prior to the sealing of the closure device 1 onto a can body.

Figure 9:
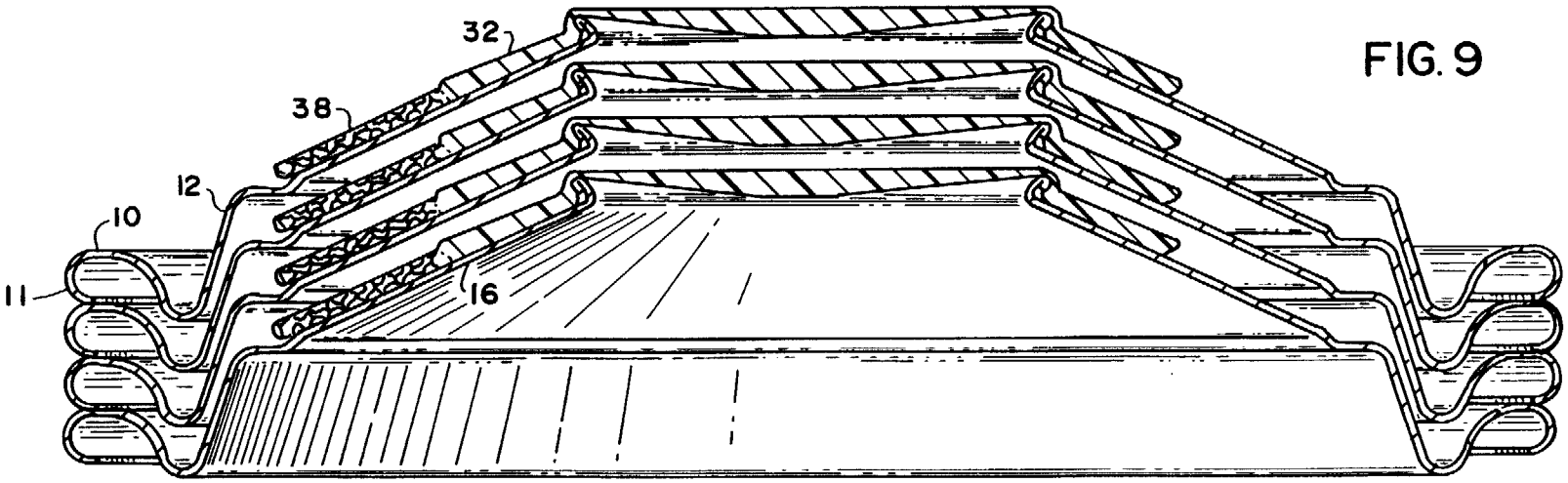
FIG. 9 is a cross-sectional view of a stack of closure devices according to the present invention.

FIG. 9 illustrates a plurality of closure devices 1 which are stacked upon each other. As can be readily seen, the only point of contact between adjacent closure devices 1 are at the outer edge 11 of the curl 10. There is no contact of the closure devices 1 between walls 16 and levers 32 or tabs 38 of adjacent closure devices 1.

Shuffling, or sideways displacement of a stack of ends, is controlled by the height of curl 10. The height of curl 10 is selected to permit stacking of closure devices 1 with only the edges 11 of curls 10 in contact. This height is selected to be greater than the vertical height of the flange 18 with closure element 2 fitted thereon.

The ability to stack the closure devices 1 is important. The closure devices 1 are shipped with the closure elements 4 sealed into the metallic ends 2. The closure devices 1 are shipped in paper-wrapped stacks or sleeve, typically containing from about 200 to about 400 closure devices 1. These closure devices 1 are used by a canner, such as a soft drink canner or beer canner, in typical high-speed can line filling operations, filling in the order of 800 to 2000 cans per minute. Only slight modifications of the tooling of these canners is required to accept the closure device 1 of the present invention. This is in contrast to other suggested resealable closure designs for cans, which typically take the form of a cap or closure element closing only a small opening in the center of the can through which filling of the can must take place, thus significantly extending the time necessary to fill the can and requiring a slow down of operating speeds, to speeds such as those typically encountered in bottling operations.

Thus, when employing the closure device 1 of the present invention, canners may retain their investment in canning equipment, with only minor modifications or adjustments, rather than a complete replacement of their can filling line with bottle-type filling machinery.

Figure 10:
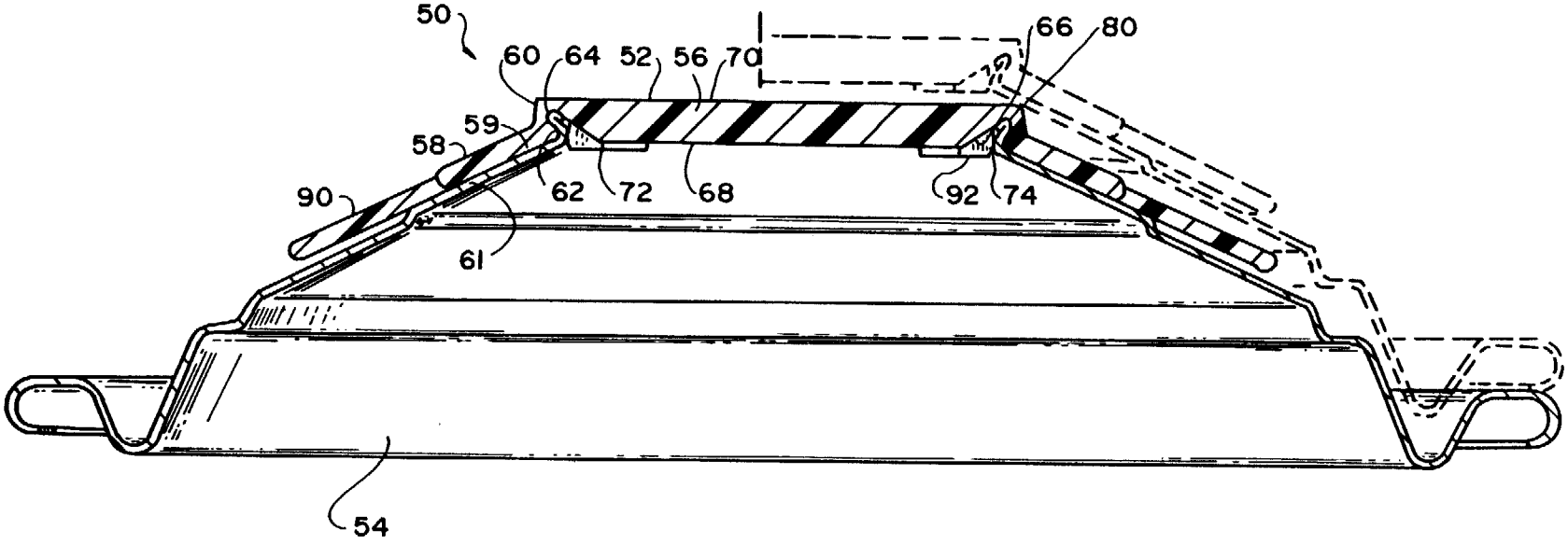
FIG. 10 is a sectional view in elevation of another embodiment of the present invention.

With reference now to FIGS. 10–12, another embodiment of the present invention is illustrated. As shown in FIG. 10, the closure device 50 includes a flexible closure element 52 similar in structure to the flexible closure element of the previous embodiment, and a metallic end wall 54.

The flexible closure element 52 is preferably made of a relatively stiff nucleated polypropylene, such as that currently available from Eastman Kodak, and identified by that company as TENITE polypropylene, P7673-838A, a nucleated version of P7673-648G, one-half percent talc. The closure element 52 includes a central panel portion 56, a lever portion in the form of a skirt 58 and a transitional connecting portion 60 connecting the lever portion 58 with the central panel 56. In this embodiment, the lever portion 58 is of substantially uniform thickness. With this arrangement, when the closure element 52 is installed on the metallic end wall 54 to close the opening 76 of the end wall 54, the lower surface 59 of lever portion 58 will be maintained in secure and sealing contact with the subjacent annular surface portion 61 of the end wall 54. As a result, the undesirable ingress of dirt and debris between the lever portion 58 and the surface portion 61 will be completely or substantially completely precluded. Activation of lever 58 down past its desired position is prohibited, by reason of the outermost portion of lever 58 coming into contact with surface portion 61. Thus, a tight seal of the closure element 52 onto end 54 is provided, as described above. The tight surface contact between the inner portion of lever 58 and surface 61 substantially reduces or eliminates the possibility of uncontrolled venting of the closure device 50, for example, when subjected to a downwardly directed axial load on center panel 56.

The connecting portion 60 of the flexible closure element 52 includes a nose portion 62 which differs from the nose portion of the previous embodiment in that the nose portion 62 completely occupies an annular recess on the exterior of neck 74 of the opening 76. This is effected to conforming the nose portion 62 with the radius of curvature of the exterior of the neck portion 74 during closing of the closure device 50. This occurs in spite of the fact that the nose 62 is molded with a radius of curvature slightly less than that of neck portion 74. It is believed that the displacement of nose 62 to its sealing position causes it to conform to the profile of neck 74. The connecting portion 60 also includes an annular recess 64 having the same radius of curvature as the bead 78 of the inwardly turned flange 80. With this arrangement, when the flexible closure element is disposed as illustrated in FIG. 10 on the end 54 a fluid-tight seal is achieved on the flange 80.

The central panel 56 is formed with a frustoconical annular wall 66 extending in a smoothly continuous manner from the annular recess 64 to the inner surface 68 of the panel 56. Surface 68 extends substantially parallel to the exterior surface 70 of the central panel 56. With this arrangement, controlled venting can be achieved since the material of the panel 56 is spaced inwardly from the inner surface of the opening 76 and no contact with surface 77 is made when the closure device 50 is under pressure. Additionally, the relatively constant thickness of central panel 56 towards its periphery, as opposed to the tapering of the previous embodiment, resists upward bulging at central panel 56 when the closure device is positioned on a container under internal pressure. This helps prevent undesired venting of the closure device 50, should the closure device 50 be subjected to a downwardly directed force or central panel 56.

To assist in locating the flexible closure element 52 in the opening 76 of the end wall 54 a plurality of locating lugs 72 are formed to extend substantially perpendicularly relative to the outer surface 70 and are spaced slightly inwardly from the neck 74 of the opening 76 when the flexible closure element 52 is installed on the opening 76 of the end wall 54. The disposition of the locating lug 72 is shown in broken lines by way of example, in FIG. 12.

With reference now to FIG. 11, there is shown in greatly enlarged detail a sectional view of the flange 80 of the metallic end wall 54 with the flexible closure element 52 removed. The manner of forming flange 80 with metal forming tooling so that the flange will assume the shape illustrated in FIG. 11 with be apparent to those skilled in this art. It is important, however, in a preferred embodiment, that certain relationships be observed.

Firstly, before the opening 76 is formed, the end wall is in the form of a single disc of metal which, after passing through a number of die forming steps is placed in condition to form the opening 76. Prior to forming the opening, the area in which the metal is removed to form the opening 76 is preferably subjected to a coining operation involving compressing the metal between dies whereby metal of region 77 adjacent the end face 79 will be stress relieved and reduced in thickness, as a result of the coining so as to become more resistant to fracturing during the subsequent forming steps. Further, it is important that the end surface 79 face inwardly relative to the neck 74 of the opening 76 whereby the exterior surface of the flange 80 such as at the curved surface 78, the flat annular surface 82 and the radial surface 84 will be smoothly surfaced.

Most importantly, it has been found that the angle A in FIG. 11, the angle at which the smooth annular surface 82 extends upwardly from the plane surface indicated in the broken line at 86 should be between about 30° and about 40° and preferably about 35°. The plane indicated at 86 is that plane which passes through an annular region defined by the smallest diameter of the neck 74 in the opening 76. It has been found that where this angular relationship is maintained, the flexible closure element 52 of FIG. 10 is retained in sealing engagement with the flange 80 at unexpectedly high pressures and, in some instances, the closure element 52 remains in place on the flange even after the metal of the container has failed due to excess pressure. Where the angle A is less than about 30°, it becomes difficult to remove the closure element 52 from metallic end 54. Where the angle A is greater than about 40°, and where the contents of the container are pressurized, the flexible closure element exhibits a tendency to slide over the flange 80. It will thus be seen that the angular range of about 30°–40° and preferably about 35° is essential to successful retention of the flexible closure element 52 on the end wall 54.

It will be appreciated from FIG. 11 that the upper end of the beaded flange 80 includes the rounded portion 78 which cooperates with the surface 64 of the closure element 52 in that the surfaces are of substantially complementary configuration in size, shape and curvature. As a result, when the closure element 52 is installed on the flange 80 of end wall 54, there will be substantially full and complete contact between the rounded surface 64 of the closure element 56 and the surface 78 of the flange 80 upon initial positioning of the closure element 52 over the opening 76 prior to inverting the lever portion 58 to the generally downwardly directed position as illustrated in FIG. 10.

FIG. 11 also illustrates angle B, which is the angle of upwardly and inwardly directed wall 61. This angle B should range between about 25° and about 35°, and preferably is about 25°. If angle B exceeds about 35°, stackability of the closure device 50 is impaired. If the angle B is less than about 25°, pourability through the metallic end 54 is impaired.

The combined angle formed by angles A and B will thus be seen to be in the range of about 55° to about 75°, and preferably about 60°.

With reference now to FIG. 12, there is shown a top plan view of the flexible closure element 52 of this embodiment. As illustrated, the outer periphery 88 of the lever portion 58 is provided with diametrically located pull tabs 90 which incorporate a tamper-evident feature in the form of a frangible connecting member 92 spanning the tip of the main body 94 of the pull tab 90 and a spaced portion 96 of the pull tab which is located on the periphery 88 of the lever portion 58 and is formed integrally therewith. Preferably, as shown, two spaced pull tabs 90 are provided although, it will be understood that in many applications a single pull tab could suffice.

With this tamper-evident feature, a user will be able to visually inspect the end wall 54 and, where the bridge 92 has been severed, this will indicate that the closure element has been tampered with.

It will be noted that unlike a purely mechanical hinge, the hinge about which the outer portion 58 is rotated in moving from the upwardly directed position similar to that of FIG. 1 of the previous embodiment and the downwardly directed position as illustrated in FIG. 10 will lie within the area of the connecting portion 60 and should be below the center of the radius of curvature of the surface portion 64 when the closure element 52 is viewed in a side direction. With this arrangement, the nose 62, when the lever portion 58 is in the upwardly directed position, will be substantially if not completely out of contact with the outermost portion of the flange 80 when the closure element 52 is first installed on the flange 80. Thus, with relatively simple modifications, presently installed closure machines can be employed with the flexible closure element of the present invention.

As with the previous embodiment, the closure device of FIGS. 10–12 are capable of mechanical stacking as can be appreciated by considering the stacking arrangement exemplified in FIG. 10 where the dotted line device is in one such stacked position.

While emphasis has been placed on closure devices for metallic cans, it should be noted that composite cans and other similar structures may also employ the closure device 1 of the present invention.

From the foregoing, it is clear that the present invention provides a resealable closure device which may be employed on standard can bodies and which overcomes the limitations and deficiencies of the previously known resealable closure devices for cans.

While the closure device of the present invention has been described with reference to certain specific embodiments thereof, it is not intended to be so limited thereby, except as set forth in the accompanying claims.

What is claimed is:

1. A closure device for a can comprising a metallic end wall having an opening therethrough and a flexible closure element, said opening being substantially surrounded by a beaded flange means that flares outwardly relative to said opening, said beaded flange means including an exterior surface portion, said end wall including a wall portion surrounding said flange means with said wall portion extending at a selected angle relative to said exterior surface portion of said flange means, said flexible closure element having a central panel, a lever portion and a connecting portion connecting said central panel with said lever portion, said lever portion being initially positioned in a first position, when said central panel is generally horizontally disposed, as a generally upwardly directed frustoconical skirt portion and having, as viewed in vertical cross-section, a nose at its connection with said connecting portion, said metallic end wall and said closure element being constructed and arranged such that, upon positioning said closure element over said opening of said metallic end wall and moving said lever portion to a second position including, when said central panel is generally horizontally disposed, moving said lever portion to a generally downwardly directed position, said nose portion will sealingly engage at least a continuous annular part of said exterior surface portion of said flange means, [said closure element being out of contact with a major portion of the inner surface of said flange means,]

said wall portion of said metallic end wall having a substantially frustoconical annular section extending outwardly from said flange means and said lever portion having a smooth surfaced section which intimately engages said substantially frustoconical annular section of said end wall when said lever portion is moved to said second position so as to substantially prevent ingress of dirt and the like between said lever portion in said second position and said annular section of said wall portion.

2. A closure device for a can comprising a metallic end wall having an opening therethrough and a flexible closure element, said opening being substantially surrounded by a beaded flange means that flares outwardly relative to said opening, said flange means including an exterior surface portion, said end wall including a wall portion surrounding said flange means with said wall portion extending at a selected angle relative to said exterior surface portion of said flange means;

said flexible closure element having a central panel, a lever portion and a connecting portion connecting said central panel with said lever portion, said lever portion being initially positioned in a first position, when said central panel is generally horizontally disposed, as a generally upwardly directed frustoconical skirt portion and having, as viewed in vertical cross-section, a nose at its connection with said connecting portion, said metallic end wall and said closure element being constructed and arranged such that, upon positioning said closure element over said opening of said metallic end wall and moving said lever portion to a second position including, when said central panel is generally horizontally disposed, moving said lever portion to a generally downwardly directed position, said nose portion will sealingly engage at least a continuous annular part of said exterior surface portion of said flange means, [said closure element being out of contact with a major portion of the inner surface of said flange means,] said selected angle between said wall portion and said exterior surface portion of said flange means lying within the range of about 55°–75°.

3. A closure device for a can comprising a metallic end wall having an opening therethrough and a flexible closure element, said opening being substantially surrounded by a beaded flange means that flares outwardly relative to said opening, said flange means including an exterior surface portion, said end wall including a wall portion surrounding said flange means with said wall portion extending at a selected angle relative to said exterior surface portion of said flange means, said flexible closure element having a central panel, a lever portion and a connecting portion connecting said central panel with said lever portion, said lever portion being initially positioned in a first position, when said central panel is generally horizontally disposed, as a generally upwardly directed frustoconical skirt portion and having, as viewed in vertical cross-section, a nose at its connection with said [connection] *connecting* portion, said metallic end wall and said closure element being constructed and arranged such that, upon positioning said closure element over said opening of said metallic end wall and moving said lever portion to a second position including, when said central panel is generally horizontally disposed, moving said lever portion to a generally downwardly directed position, said nose portion will sealingly engage at least a continuous annular part of said exterior surface portion of said flange means, [said closure element being out of contact with a major portion of the inner surface of said flange means,]

said opening of said end wall having a neck portion of minimum diameter relative to other portions of said opening, said exterior surface portion of said flange means extending at a selected angle of between about 30° and about 40° to a plane passing through said neck portion.

4. A closure device for a can comprising a metallic end wall having an opening therethrough and a flexible closure element, said opening being substantially surrounded by a beaded flange means that flares outwardly relative to said opening, said flange means including an exterior surface portion, said end wall including a wall portion surrounding said flange means with said wall portion extending at a selected angle relative to said exterior surface portion of said flange means, said flexible closure element having a central panel, a lever portion and a connecting portion connecting said central panel with said lever portion, said lever portion being initially positioned in a first position, when said central panel is generally horizontally disposed, as a generally upwardly directed frustoconical skirt portion and having, as viewed in vertical cross-section, a nose at its connection with said [connection] *connecting* portion, said metallic end wall and said closure element being constructed and arranged such that, upon positioning said closure element over said opening of said metallic end wall and moving said lever portion to a second position including, when said central panel is generally horizontally disposed, moving said lever portion to a generally downwardly directed position, said nose portion will sealingly engage at least a continuous annular part of said exterior surface portion of said flange means, [said closure element being out of contact with a major portion of the inner surface of said flange means,]

said central panel including a substantially flat outer surface and a substantially flat inner surface with said inner and outer surfaces extending substantially parallel to one another, said inner and outer surfaces of said central panel being connected by a frustoconical wall extending substantially entirely around said central panel with said frustoconical wall sloping inwardly towards said inner surface of said central panel away from said connecting portion of said closure element.

5. The invention as claimed in claim 4, wherein said frustoconical wall has at spaced apart intervals abutment means for engaging an inner surface of said flange means.

6. The invention as claimed in claim 1, 2, 3 or 4 wherein said flange means of said metallic end wall includes a bent over end section with the end section extending in the direction of said opening.

7. The invention as claimed in claim 1, 2, 3 or 4 wherein said lever portion has an outer periphery and at least one pull tab is connected to said outer periphery of said lever portion.

8. The invention as claimed in claim 7, wherein said pull tab has means for indicating tampering therewith.

9. The invention as claimed in claim 2, wherein said selected angle is approximately 60°.

10. The invention as claimed in claim 3 wherein said selected angle is approximately 35°.

11. The closure device of claim 1, 2, 3 or 4 wherein said metallic end is formed from an aluminum alloy.

12. The closure device of claim 1, 2, 3 or 4, wherein said flexible closure element is formed from [polyvinylidene] *polypropylene.*

13. The closure device of claim 1, 2, 3 or 4, wherein said flexible closure element is formed from polyethylene.

14. The closure device of claim 1, 2, 3 or 4 wherein contacting surfaces of said metallic end includes a coating thereon.

15. The closure device of claim 14 wherein said coating comprises a wax or lacquer.

16. The closure device of claim 1, 2, 3 or 4 wherein said closure element is coated with a low gas transmission rate coating material.

17. The closure device of claim 16 wherein said coating material comprises polyvinylidene chloride.

18. The closure device of claim 16 wherein said coating material comprises ethylene vinyl alcohol.

19. The closure device of claim 1, 2, 3 or 4 wherein said end wall includes means for attachment comprising a curl.

20. The closure device of claim 1, 2, 3 or 4 wherein said end wall has means for attachment comprising a surface which may be adhesively bonded to a can.

21. The closure device of claim 1, 2, 3 or 4 wherein said flange means is inwardly beaded.

22. The closure device of claim 1, 2, 3 or 4 wherein said lever portion is of increasing thickness from said connecting portion to its outer periphery.

23. The closure device of claim 1, 2, 3 or 4 wherein said lever portion includes a thickened ring portion on its outer periphery.

24. The closure device of claim 1, 2, 3 or 4 wherein said metallic end wall is heated prior to assembly of said closure device.

25. The closure device of claim 1, 2, 3 or 4 wherein said closure element is heated prior to installation on said end wall.

26. The invention of claim 25 wherein said closure element is heated to a temperature between about 95° and 120° F.

27. A closure device for a can comprising a metallic end wall having an opening therethrough and a flexible closure element, said opening being substantially surrounded by a beaded flange means that flares outwardly relative to said opening, said beaded flange means including an exterior surface portion, said end wall including a wall portion surrounding said flange means with said wall portion extending at a selected angle relative to said exterior surface portion of said flange means, said flexible closure element having a central panel, a lever portion and a connecting portion connecting said central panel with said lever portion, said lever portion being initially positioned in a first position, when said central panel is generally horizontally disposed, as a generally upwardly directed frustoconical skirt portion and having, as viewed in vertical cross-section, a nose at its connection with said connecting portion, said metallic end wall and said closure element being constructed and arranged such that, upon positioning said closure element over said opening of said metallic end wall and moving said lever portion to a second position including, when said central panel is generally horizontally disposed, moving said lever portion to a generally downwardly directed position, said nose portion will sealingly engage at least a continuous annular part of the said exterior surface portion of said flange means, said closure element being out of contact with *at least* a [major] portion of the inner surface of said flange means, said beaded flange means including a rounded portion and said closure element including a surface that is of substantially complementary configuration in size, shape and curvature to said rounded portion so that said rounded portion and said surface on said closure element are in substantially full and complete contact with each other upon initial positioning of said closure element over said opening prior to inverting said lever portion to a generally downwardly directed position.

28. A closure device for a can comprising a metallic end wall having an opening therethrough and a flexible closure element, said opening being substantially surrounded by a beaded flange means that flares outwardly relative to said opening, said beaded flange means including an exterior surface portion, said end wall including a wall portion surrounding said flange means with said wall portion extending at a selected angle relative to said exterior surface portion of said flange means, said flexible closure element having a central panel, a lever portion and a connecting portion connecting said central panel with said lever portion, said lever portion being initially positioned in a first position, when said central panel is generally horizontally disposed, as a generally upwardly directed frustoconical skirt portion and having, as viewed in vertical cross-section, a nose at its connection with said connecting portion, said metallic end wall and said closure element being constructed and arranged such that, upon positioning said closure element over said opening of said metallic end wall and moving said lever portion to a second position including, when said central panel is generally horizontally disposed, moving said lever portion to a generally downwardly directed position, said nose portion will sealingly engage at least a continuous annular part of said exterior surface portion of said flange means, [said closure element being out of contact with a major portion of the inner surface of said flange means,]

said metallic end wall having a substantially frustoconical annular section extending outwardly from said flange means and said lever portion having a smooth surfaced section which intimately engages said substantially frustoconical annular section of said end wall when moved to said second position so as to substantially prevent ingress of dirt and the like between said lever portion in said second position and said annular section of said end wall, said opening of said end wall having a neck portion of minimum diameter relative to other portions of said opening, said exterior surface portion of said flange means extending at a selected angle of between about 30° and about 40° to a plane passing through said neck portion, said central panel including a substantially flat outer surface and a substantially flat inner surface with said inner and outer surfaces extending substantially parallel to one another, said inner and outer surfaces of said central panel being connected by a frustoconical wall extending substantially entirely around said central panel with said frustoconical wall sloping inwardly toward said inner surface of said central panel away from said connecting portion of said closure element.

29. A closure device for a can, said closure device comprising a metallic end and a flexible closure element, said metallic end having an opening therein bounded by an outwardly and upwardly flaring beaded flange and having means adjacent its periphery for attachment to said can, said metallic end including an upwardly and downwardly tapering section between said means and said flange, said flexible closure element having a central panel, a lever portion and a connecting portion connecting said central panel and said lever portion, said lever portion being initially positioned as a generally upwardly directed frustoconical portion or skirt and having, as viewed in vertical cross-section, a nose at its connection with said connecting portion, said metallic end and said closure element being constructed and arranged such that upon positioning said closure element over said opening in said metallic end and inverting said lever portion to a generally downwardly directed position, said nose portion sealingly contacts the outer surface of said flange without mechanically hooking under the outer surface of said flange and said connecting portion sealingly contacts said flange in a tangential relationship defined between said central panel and said flange while said lever portion abuts against said tapering section of said metallic end, [said closure element being out of contact with the inner surface of said flange].

30. The closure device of claim 29 wherein the upper end of said beaded flange includes a rounded portion and said closure element includes a surface that is of substantially complementary configuration in size, shape and curvature to said rounded portion so that said rounded portion and said surface on said closure element are in substantially full and complete contact with each other upon the initial positioning of said closure element over said opening prior to inverting said lever portion to a generally downwardly directed position.

31. The closure device of claim 30 wherein, when viewed in vertical cross-section, the surface of said beaded flange immediately below said rounded portion is a straight line, and the surface of said closure element immediately below said complementary portion thereof is also a straight line, whereby said inverting brings the two straight line surfaces into contact with each other without any substantial sliding therebetween.

32. The closure device of claim 29 wherein said metallic end is formed from a steel or aluminum alloy.

33. The closure device of claim 29 wherein said flexible closure element is formed from polyethylene [of] *or* polypropylene.

34. The closure device of claim 29 wherein contacting surfaces of said metallic end and/or said flexible closure element includes a coating thereon.

35. The closure device of claim 34 wherein said coating comprises a was [of] *or* lacquer.

36. The closure device of claim 29 wherein said flexible closure element is coated with a low gas transmission rate coating material.

37. The closure device of claim 36 wherein said coating material comprises polyvinylidene chloride or ethylene vinyl alcohol.

38. The closure device of claim 29 wherein said means for attachment comprises a curl.

39. The closure device of claim 29 wherein said means for attachment comprises a surface which may be adhesively bonded to said can.

40. The closure device of claim 29 wherein said flange is outwardly beaded.

41. The closure device of claim 29 wherein said flange is inwardly beaded.

42. The closure device of claim 29 wherein said lever portion is of increasing thickness from said connecting portion to its outer periphery.

43. The closure device of claim 29 wherein said lever portion includes a thickened ring portion on its outer periphery.

44. The closure device of claim 29 wherein said lever portion includes at least one tab at its outer periphery.

45. The closure device of claim 29 wherein said central panel is of decreasing thickness towards its outer periphery.

46. The closure device of claim 29 wherein said metallic end and/or said flexible closure element is heated prior to assembly of said closure device.

47. The closure of claim 46 wherein said metallic end and/or said flexible closure element is heated to a temperature between about 95° and 150° F. (35° and 65.6° C.).

*48. The closure device of claim 1, 2, 3, 4, 27, 28 or 29 wherein said closure element, when said lever portion is in said second position, is out of contact with a major portion of said flange means.*

*49. The closure device of claim 1, 2, 3, 4, 27, 28 or 29 wherein said closure element, when said lever portion is in said second position, is out of contact with a sufficient portion of said inner surface of said flange means that said closure element does not form a plug that seals against the inner surface of said flange means.*

*50. The closure device of claim 1, 2, 3, 4, 28 or 29 wherein said closure element, when said lever portion is in said second position, is out of contact with at least a portion of said inner surface of said flange means.*

*51. The closure device of claim 1, 2, 3, 4, 27, 28 or 29 wherein said closure element does not form a plug that seals against the inner surface of said flange means.*

* * * * *